United States Patent [19]
Kauffman

[11] Patent Number: 5,414,620
[45] Date of Patent: May 9, 1995

[54] SYNTHETIC FRICTION ALGORITHM FOR A HAND CONTROL ELEMENT

[75] Inventor: James W. Kauffman, Palm Harbor, Fla.

[73] Assignee: Honeywell Inc., Minneapolis, Minn.

[21] Appl. No.: 103,899

[22] Filed: Aug. 9, 1993

[51] Int. Cl.$^6$ .............................................. G05B 19/18
[52] U.S. Cl. ................. 364/167.01; 364/190; 414/5; 244/223
[58] Field of Search ........... 364/146, 167.01, 188-193; 414/5, 2, 6, 7; 901/33, 34; 318/632, 561, 618, 615; 244/223, 228, 236, 234; 340/870.32, 870.35

[56] References Cited

U.S. PATENT DOCUMENTS

| | | | |
|---|---|---|---|
| 4,150,803 | 4/1979 | Fernandez | 244/135 A |
| 4,313,165 | 1/1982 | Clelford et al. | 364/190 |
| 4,791,588 | 12/1988 | Onda et al. | 901/34 |
| 4,800,721 | 1/1989 | Cemenska et al. | 364/190 |
| 4,819,184 | 4/1989 | Jonsson et al. | 364/191 |
| 4,912,386 | 3/1990 | Lorie | 318/615 |
| 4,950,116 | 8/1990 | Nishida | 414/5 |
| 4,962,448 | 10/1990 | DeMaio et al. | 364/146 |
| 5,103,404 | 4/1992 | McIntosh | 318/568.22 |
| 5,116,180 | 5/1992 | Fung et al. | 414/5 |
| 5,223,776 | 6/1993 | Radke et al. | 318/568.1 |
| 5,264,768 | 11/1993 | Gregory et al. | 318/561 |
| 5,347,204 | 9/1994 | Gregory | 318/632 |

FOREIGN PATENT DOCUMENTS 518,303 12/1992 EPO
920,982 6/1992 WIPO

*Primary Examiner*—James P. Trammell
*Attorney, Agent, or Firm*—Thomas A. Rendos

[57] ABSTRACT

Synthetic friction force algorithms provide simulated static friction forces as well as dynamic friction forces. On either side of a hand-control element reference position a small static friction zone is established. As long as the hand-control element is within this static friction zone, the reference position remains constant and the control element drive motor generates a centering force proportional to the distance of the hand-control element from the reference position; a force urging the hand-control element toward the reference position. When the relative position of the hand-control element reaches or exceeds an edge of the static friction zone, it enters the dynamic friction zone. The motor applies a constant dynamic friction force, urging the hand-control element toward the reference position and the reference position is translated so that the edge of the static friction zone is translated to the current hand-control element position.

3 Claims, 6 Drawing Sheets

SYNTHETIC FRICTION ALGORITHM FOR A HAND CONTROL ELEMENT

BACKGROUND OF THE INVENTION

CROSS REFERENCE TO RELATED APPLICATIONS

This application is related to the following applications:

1. Active Hand Controller Feedback Loop, Ser. No. 07/957,278, now U.S. Pat. No. 5,264,768.
2. Rate Mode Hand Controller With Force Reflection, Ser. No. 08/149,018 which is a continuation of Ser. No. 07/715,825, now abandoned.
3. Position Dependent Rate Dampening in an Active Hand Controller, Ser. No. 07/957,427, now U.S. Pat. No. 5,347,204.

1. Field of the Invention

This invention relates to an improved, active, position mode hand controller, and more particularly to position mode hand controller with a synthetic friction algorithm suitable for use with static, and quasi static controllers. This invention can be used alone or in combination with other hand controller systems, such as, for example, those of the above-referenced co-pending applications.

The invention described herein was made in the performance of work under NASA Contract No. NAS9-18200 and is subject to the provisions of Section 305 of the National Aeronautics and Space (NASA) Act of 1958 (42 U.S.C. 2457). The invention described herein has been granted NASA Waiver Case No. W-2887.

2. Description of the Prior Art

Position mode hand controllers are used to control the position of a remote tool or object in accordance with movement by an operator of a hand-control element also referred to as a grip. A desirable characteristic of a position mode hand controller is to have the hand-control element stay in position when no force is applied to it. Similarly, it is also desirable that an operator easily be able to confine the movement of a hand-control element to movement along a single axis even though the element is capable of movement along more than one axis.

Friction in the prior art has been introduced into the controller system both in order to provide a force that tends to keep the hand-control element at a rest position when no force is applied and to keep an element moving along a single axis in response to a single axis input force.

In prior art passive hand controllers, friction is usually provided mechanically (see FIG. 1A and 1B). As shown in FIG. 1A, the movement of hand controller element (10) in either the (+) or (−) direction is mechanically linked to a position transducer (14) which generates an electrical signal that is input into a robotic controller 16 which acts upon the controlled element 20 via mechanical means. In such hand controller mechanical mechanizations, friction mechanisms are frequently provided which supply the feel characteristics illustrated in FIG. 1B. This model of friction, prior art documented in many publications, defines a static friction (sometimes called break away friction) and dynamic friction which decreases as a function of velocity between the sliding elements to a nominal constant. Mechanical friction can also be provided in so-called active position mode hand controllers (i.e., controllers with motor driven hand-control elements). In active hand controllers, introduction of mechanical friction is disadvantageous for several reasons. Mechanical friction in an active position mode controller increases power consumption and, hence, is inefficient. Further, a mechanical approach to the introduction of friction requires extra mechanical parts that in turn increase the size and weight of the controller and decrease its reliability.

Prior art proposals for active, position mode, hand controllers include simulating friction by means of the hand-control element drive motor. These prior art proposals are generally based on a model that assumes friction is a constant force opposing velocity. Here the velocity vector of the hand-control element is determined and the motor is controlled to produce a constant force (or add a constant force to an otherwise commanded force) in a direction opposite the velocity vector. This is either done in electronic hardware or with software. This approach is satisfactory for a dynamic hand controller application where the hand-control element constantly is in motion. It is not satisfactory, however, for static or quasi static application where the hand-control element is frequently at zero, or at near zero, velocity.

SUMMARY OF THE INVENTION

An object of this invention is the provision of an active position mode hand controller with a synthetic friction algorithm that provides a friction simulating force to oppose motion in static, and quasi static systems, as well as dynamic systems.

Briefly, this invention contemplates synthetic friction force algorithms that provide simulated static friction forces as well as dynamic friction forces. On either side of a reference position a small static friction zone of fixed width and centered on the reference position is established. As long as the hand-control element position is within this static friction zone, the reference position remains constant and the control element drive motor generates a centering force proportional to the distance of the hand-control element from the reference position (e.g., a force urging the hand-control element toward the reference position). When the relative position of the hand-control element reaches or exceeds an edge of the static friction zone, it enters the dynamic friction zone, and the motor applies constant dynamic friction force to the hand-control element toward the reference position. When the hand-control element reaches or exceeds the edge of the static friction zone, the reference position is redefined so as to translate the closest static friction zone edge to the current measured position of the hand-control element. Thereby the position of the hand-control element controls the position of the static friction zone.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
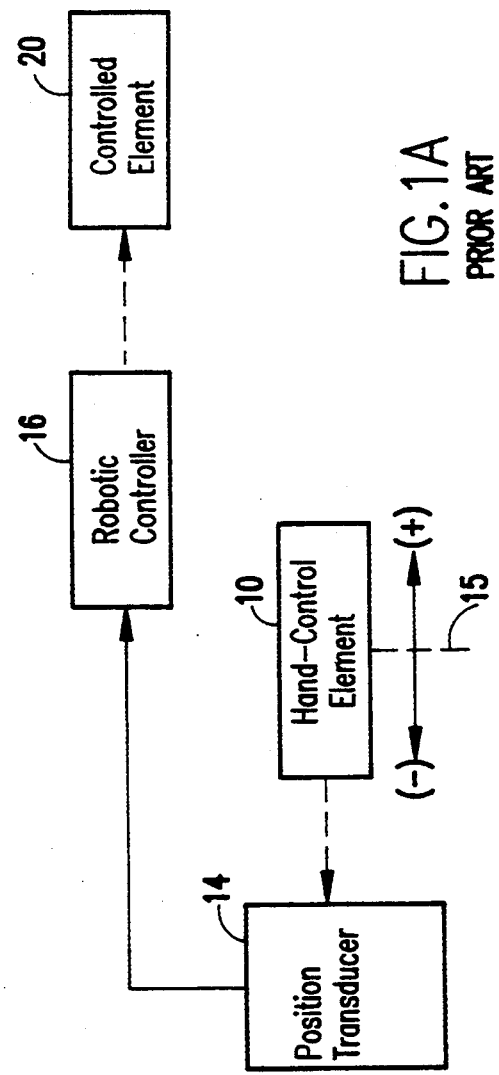
FIGS. 1A and 1B are respectively a block diagram of a prior art passive hand-controller and a diagram of the friction "feel" desired for such controllers.
Figure 1B:
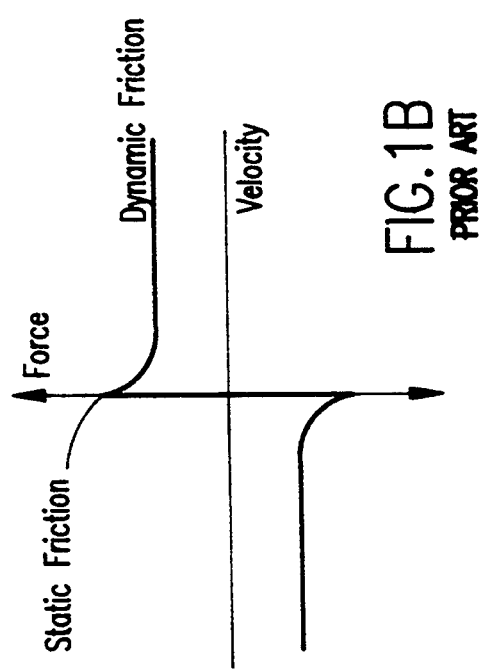
Figure 2:
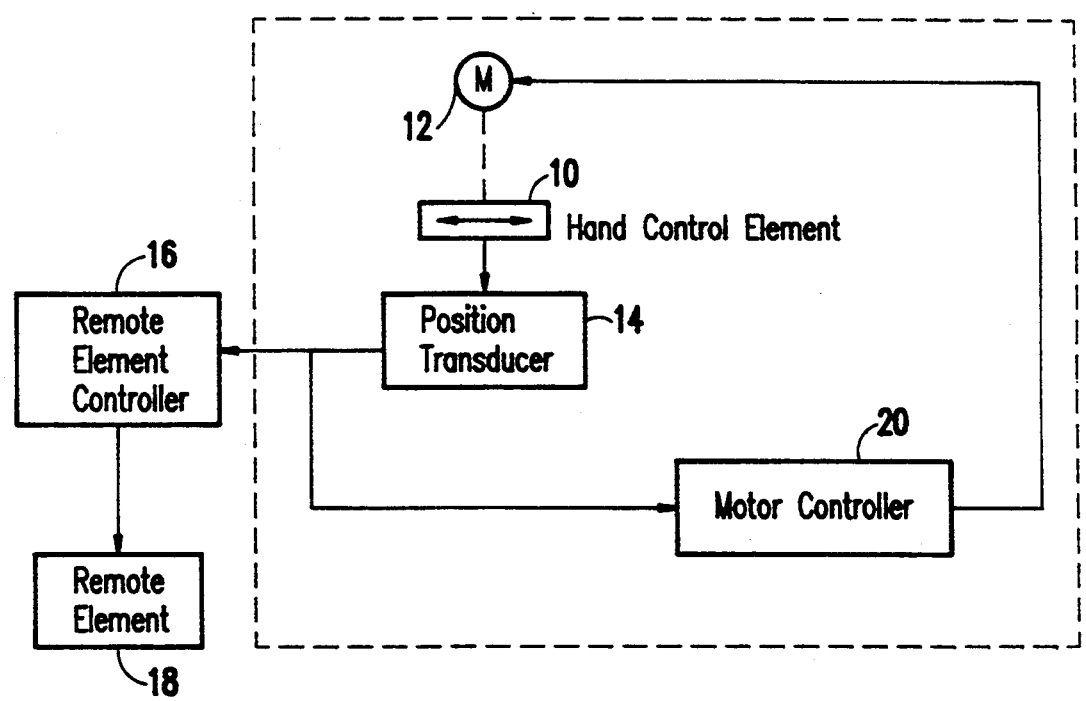
FIG. 2 is a block diagram of an active, position mode, hand-control system.

Referring now to FIG. 2, a hand-control element 10 is mechanically coupled to a control motor 12 and to a position transducer 14. For ease of illustration, the system shown has only one degree of freedom along the + and − translational X axis. However, as will be appreciated by those skilled in the art, a typical hand-control system could have up to six degrees of freedom and the teachings of this invention can be readily applied to such multi-axis hand-control systems.

An output of position transducer 14 is coupled to a position control system 16 for a remote element 18 whose position is controlled by the hand-control element 10, as is conventional in the art. The output of position transducer 14 is also coupled to the input of a motor controller 20 whose output controls, for example, the voltage across the control motor 12 and hence the force applied by the control motor 12 to the hand-control element 10 to control its movement and forces in a manner similar to that in U.S. Pat. No. 5,264,768.

Figure 3A:
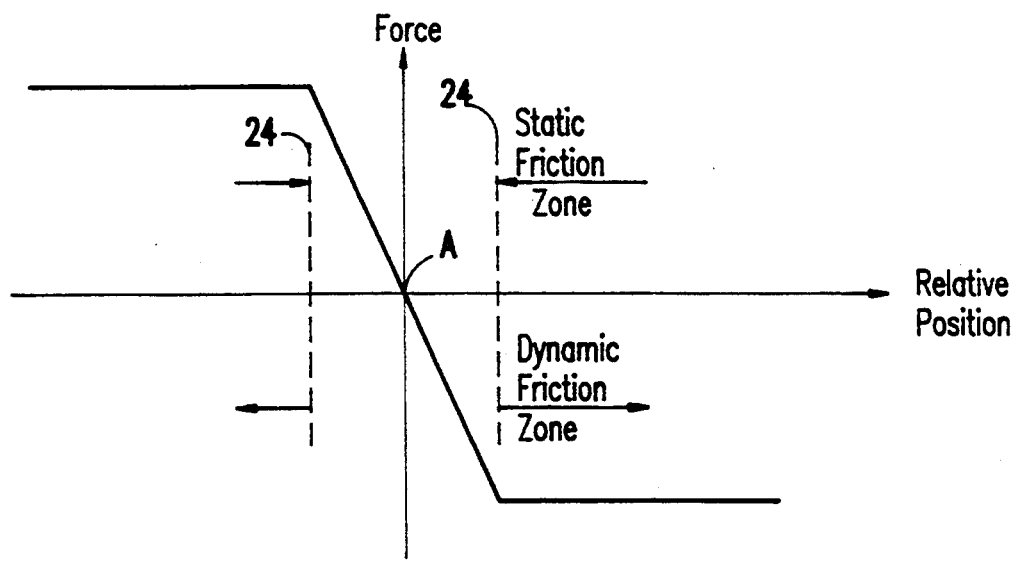
FIG. 3A is a diagram of synthetic friction force vs. hand-control element displacement in accordance with one embodiment of the teachings of this invention.
Figure 3B:
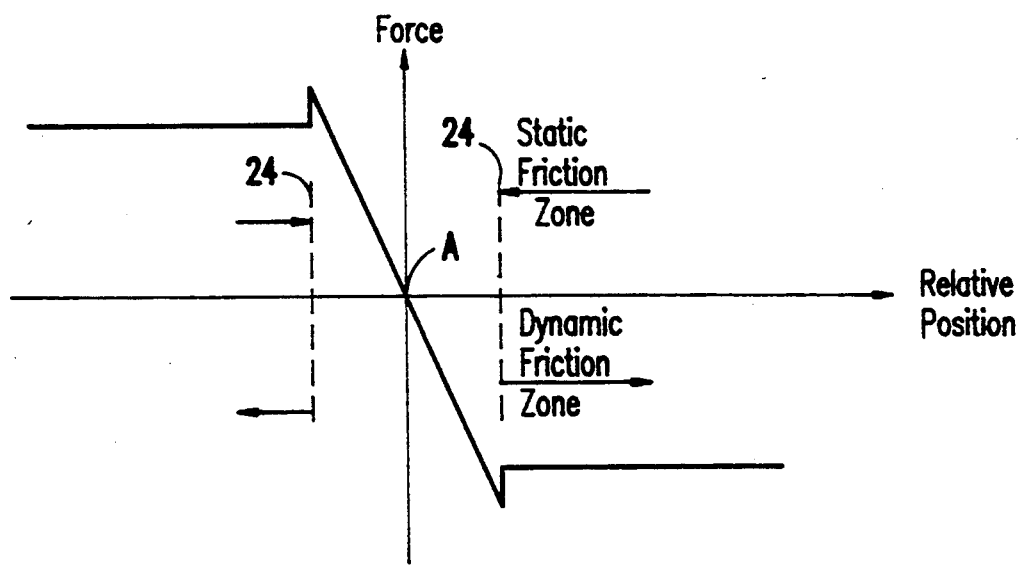
FIG. 3B is a diagram similar to FIG. 3A in accordance with another embodiment of the invention.

Referring now to FIGS. 3A and 3B, each shows a diagram of the synthetic friction force applied by control motor 12 to the hand-control element as a function of the position of the hand-control element relative to a reference position (point A in FIGS. 3A and 3B). A static friction zone extends a short distance from each side of the reference position to the dotted lines 24. Beyond the dotted lines 24 is a zone of dynamic friction. In the embodiment of the invention illustrated in FIG. 3A, the synthetic friction force increases linearly as the hand-control element moves from the reference position, point A, to the boundary of the static friction zone. After the hand-control element passes the static friction zone boundary, the force exerted by the motor (synthetic dynamic friction) is held at a constant value equal to the maximum force applied in the static friction zone in a direction toward the reference position. In the embodiment of FIG. 3B, the dynamic friction force is less than the maximum static friction force, a state that replicates a common relation between mechanical static and dynamic friction forces. As will be appreciated by those skilled in the art, the force applied by the control motor 12 to the hand-control element 10 can conveniently be controlled by controlling the voltage applied to the control motor (12) as a function of distance from the reference point in the static friction zone and by applying a constant voltage to the control motor (12) in the dynamic friction zone.

Figure 4:
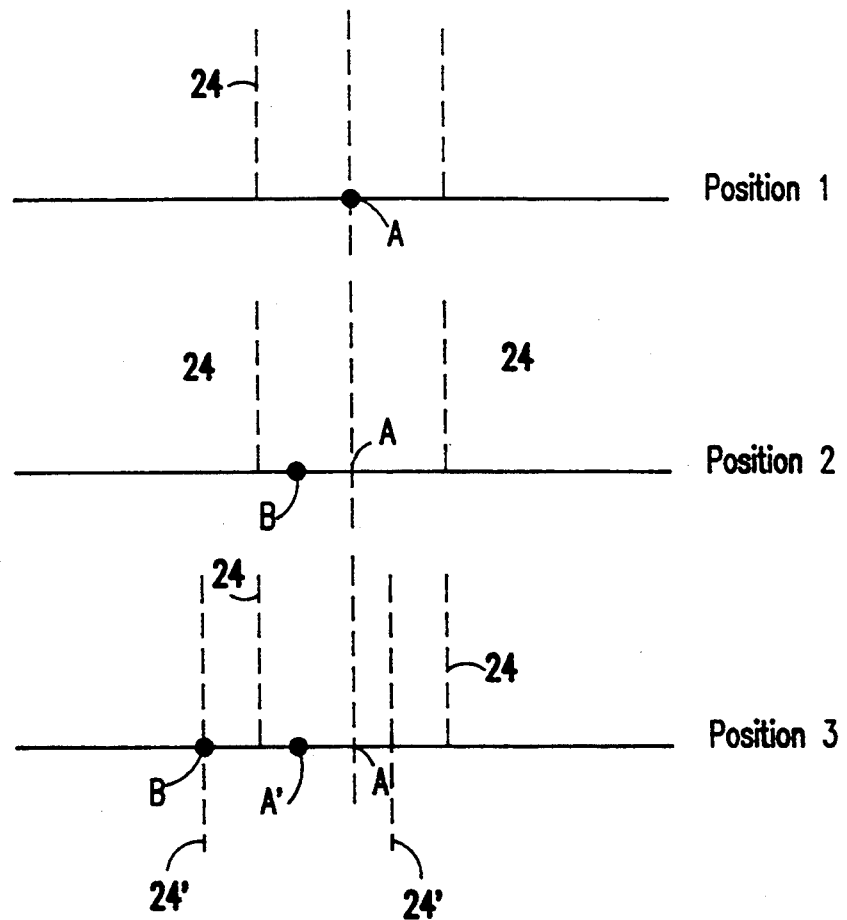
FIG. 4 is a diagram illustrating the translation of the hand-control element reference position as a function of hand-control element displacement.

Referring now to FIG. 4, the reference position A is initially the static position of the hand-control element 10; illustrated position 1 of FIG. 4. So long as the hand-control element position, B, remains in the static friction zone, the zone boundaries 24 and the reference position A remain unchanged, the situation illustrated in position 2 of FIG. 4. Whenever the hand-control element position, B, enters the dynamic friction zone in position 3 of FIG. 4, the reference position A is redefined to point A′ so as to translate the closest zone boundary from 24 to 24′, the then current position, B, of the hand-control element. When operator-applied force is removed from the hand-control element after redefinition of the static friction zone, the motor will urge the hand-control element form the edge of the static friction zone to the new reference position.

Figure 5:
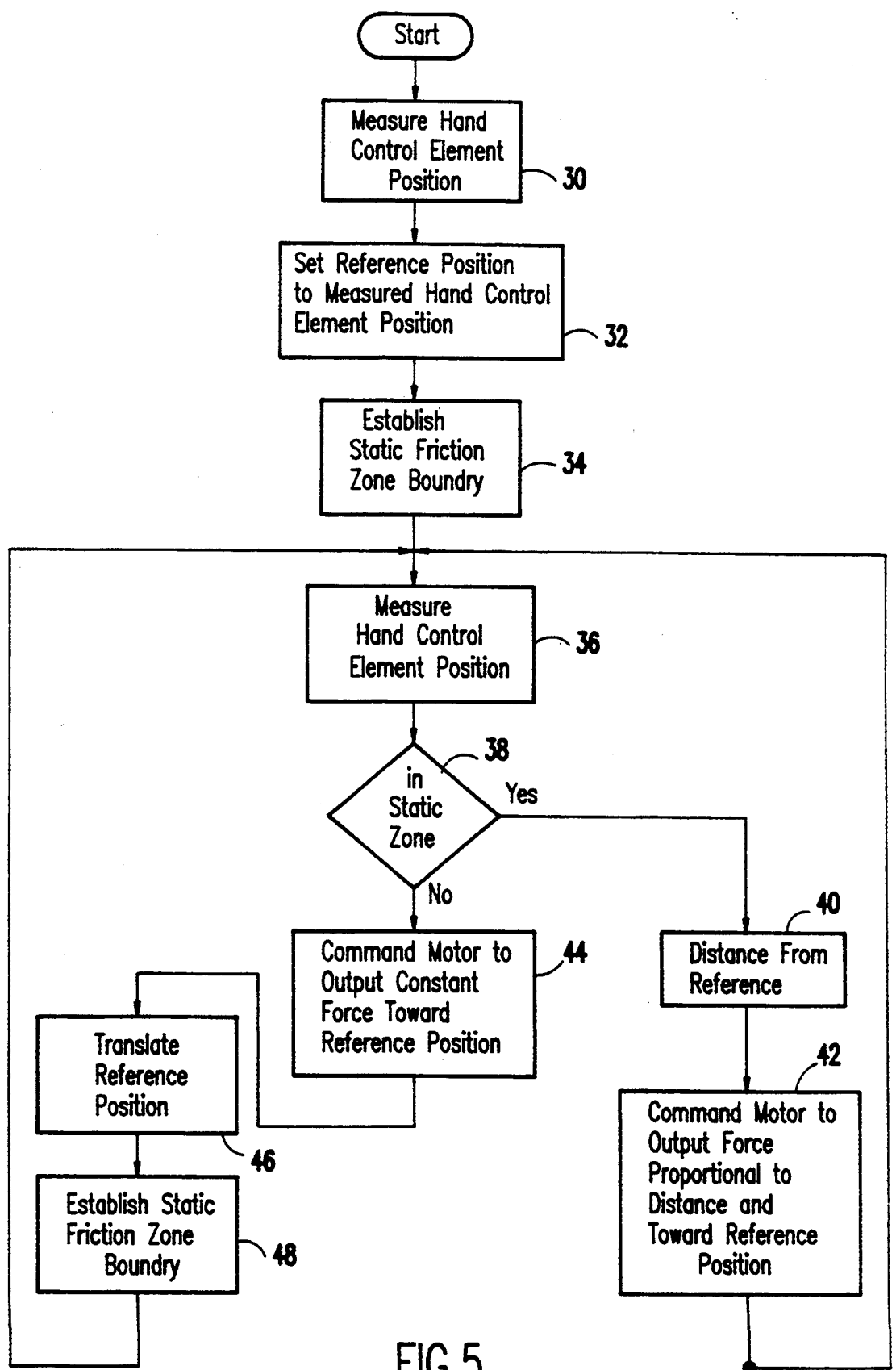
FIG. 5 is a flow diagram showing an implementation of a synthetic friction force algorithm in accordance with the teachings of this invention.

Referring now to FIG. 5, it will be appreciated that the motor controller 20 can be implemented conveniently as a microprocessor-based controller. FIG. 5 is a flow diagram of the process steps that provide synthetic friction in accordance with the teachings of this invention. The process starts at block 30 by measuring the position of the hand control element. At block 32 the reference position A is established for the hand-control element. The program establishes the static friction zone boundary locations a predetermined short distance on either side of the reference position, block 34. At block 36, the position of the hand control element is measured and, in decision block 38, a determination is made as to whether or not the measured position is within or without the static zone.

If the element is within the static friction zone, the distance of the element from the reference position is determined at block 40. At block 42, an output signal is generated that commands the motor 12 so that it develops an output force proportional to the distance from the reference and in the direction of the reference position. The process then repeats starting with block 36.

If the hand-control element is outside the static friction zone at decision block 38, at block 44 an output signal is generated that commands the motor 12 so that it develops a constant output force directed toward the reference position. In the embodiment of the invention illustrated in FIG. 3A, this voltage is equal to the voltage coupled to the motor as the hand-control element crossed the zone boundary. In the embodiment of FIG. 3B, the constant dynamic friction voltage is slightly less than the voltage at the static friction zone boundary. At the same time, the reference position is translated, block 46 and new static friction zone boundaries are established, block 48, so that the closest static friction zone boundary is at the current position of the hand control element. The process then returns to block 36.

Figure 6:
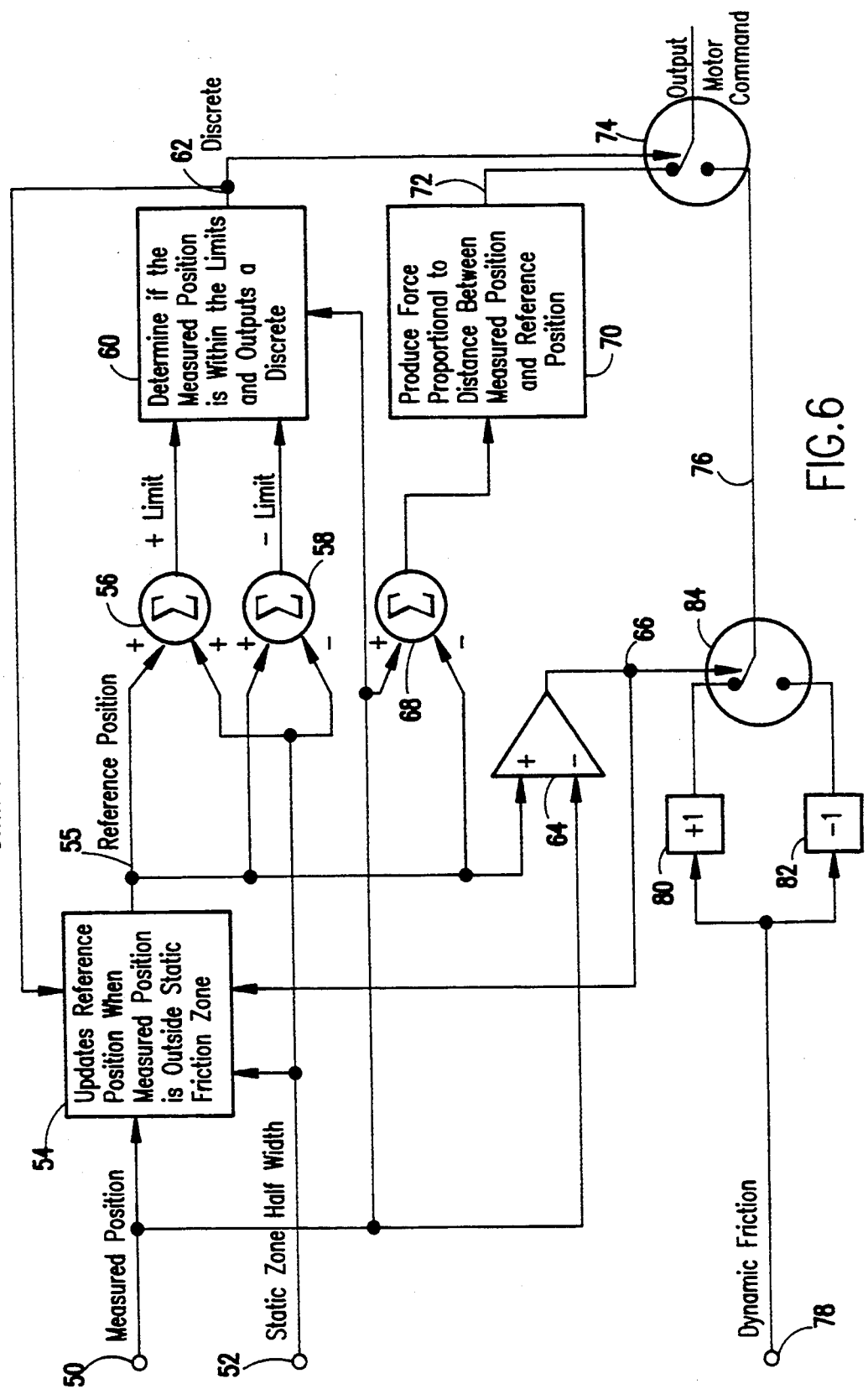
FIG. 6 is a functional hardware diagram of an embodiment of the invention.

Referring now to FIG. 6, it illustrates an operational implementation of synthetic friction in accordance with the teachings of this invention. The current, measured hand control position, at terminal 50, and a signal corresponding to half the static friction zone width at terminal 52, are inputted to functional block 54, which updates the reference position whenever the measured position is outside the static friction zone. The reference position 55 output of functional block 54 is coupled as one input to summing blocks 56 and 58 whose other inputs are the signal corresponding to half the static friction zone width from terminal 52. The reference position signal plus the static zone half width signal form the upper limit of the static friction zone and the reference position signal minus the static zone half width signal form the lower limit of the static friction zone. Function block 60 determines if the measured position is within the limits and output a discrete signal at node 62; if within limits the node is set low, if without the limits the node is set high. The state of node 62 is fed back to function block 54, which updates the reference position whenever node 62 is high. A comparator 64 provides a discrete output at node 66; high if the reference position is greater than the measured position and low if the reference position is less than the measured position. Node 66 is also coupled back to function block 54 to the end that, if node 66 is high, the reference position output signal at node 55 is the sum of the measured position signal at terminal 50 and the static zone half width signal at terminal 52, and, if node 66 is low, the reference position signal is equal to the measured position signal minus the static zone half width signal.

Summing block 68 subtracts the reference position signal from the measured position signal and outputs a signal proportional to the distance between the reference position and the measured position. This proportional signal is coupled to function block 70, which linearly scales the proportional signal to generate a static friction output signal at 72. Switch 74 couples the static friction output signal to the motor 12 if the measured position is within limits (i.e. node 62 is low) and couples a dynamic friction input 76 to the motor if the measured position is without the limits (i.e. node 62 is high).

A signal at terminal 78 corresponding to the desired amount of dynamic friction is coupled as an input to a unity gain amplifier 80 and to an inverter 82. Switch 84 selects the output of amplifier 82 if the reference position is greater than the measured position (i.e. node 66 is high) and selects the output of amplifier 80 if the reference position is less than the measured position (i.e. node 66 is low).

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method for simulating friction forces in an active, position mode hand controller that includes a hand-control element and a motor coupled to said hand-control element, said method comprising the steps of:

establishing a reference position;

establishing a static friction zone having a static zone boundary that extends a short distance on either side of said reference position;

linearly increasing a force toward said reference position applied by said motor to said control element as said hand-control element moves from said reference position within said static friction zone;

maintaining a constant force toward said reference position applied by said motor to said control element as said hand-control element moves from said reference position outside said static friction zone; and redefining said reference position when a position of said hand-control element crosses said static zone boundary of said static friction zone, by translating said static zone boundary closest to said position of said hand-control element, to said position of said hand-control element.

2. A method for simulating friction forces in an active, position mode hand controller as in claim 1, wherein said constant force is equal to said linearly increasing force toward said reference position when said hand-control element reaches said boundary of said static friction zone.

3. A method for simulating friction forces in an active, position mode hand controller as in claim 1, wherein said constant force towards said reference position is less than said linearly increasing force toward said reference position when said hand-control element reaches said boundary of said static friction zone.

* * * * *